United States Patent [19]

Hötger

[11] Patent Number: 4,462,619
[45] Date of Patent: Jul. 31, 1984

[54] MECHANICAL SEALING MEANS FOR ROTARY FLUID COUPLING

[75] Inventor: Karl Hötger, Bochum, Fed. Rep. of Germany

[73] Assignee: Gebr. Eickhoff Maschinenfabrik und Eisengiesserei m.b.H., Bochum, Fed. Rep. of Germany

[21] Appl. No.: 288,414

[22] Filed: Jul. 30, 1981

[30] Foreign Application Priority Data

Aug. 13, 1980 [DE] Fed. Rep. of Germany ....... 3030540

[51] Int. Cl.³ .............................................. F16L 7/00
[52] U.S. Cl. ...................................... 285/94; 285/98; 285/190
[58] Field of Search ............... 285/10, 11, 94, DIG. 1, 285/190, 95, 98, 281

[56] References Cited

U.S. PATENT DOCUMENTS

| | | | |
|---|---|---|---|
| 1,994,169 | 3/1935 | Comins | 285/11 |
| 2,210,088 | 8/1940 | Longfield | 285/190 X |
| 2,810,592 | 10/1957 | Williams | 285/94 X |
| 2,877,026 | 3/1959 | Payne et al. | 285/98 X |
| 3,694,008 | 9/1972 | Slator et al. | 285/190 X |
| 3,746,372 | 7/1973 | Hynes et al. | 285/94 X |

Primary Examiner—Dave W. Arola
Attorney, Agent, or Firm—Thomas H. Murray; Clifford A. Poff

[57] ABSTRACT

A fluid coupling for interconnecting a liquid-conveying duct in a shaft element to a duct in a hub element, the two elements being rotatable relative to each other. The shaft element has a central passageway subjected to fluid under high pressure and has an enlarged-diameter end communicating with a smaller-diameter portion. The end of the large diameter portion of the shaft element remote from its small diameter portion is subjected to fluid under high pressure in said passageway; while the opposite end of the large diameter shaft portion is subjected to a sealing fluid. The pressure of the sealing fluid is always greater than that of the high-pressure fluid, with the result that the high-pressure fluid will not enter the chamber filled with sealing fluid to decompose it and form an emulsion.

5 Claims, 1 Drawing Figure

U.S. Patent  Jul. 31, 1984  4,462,619
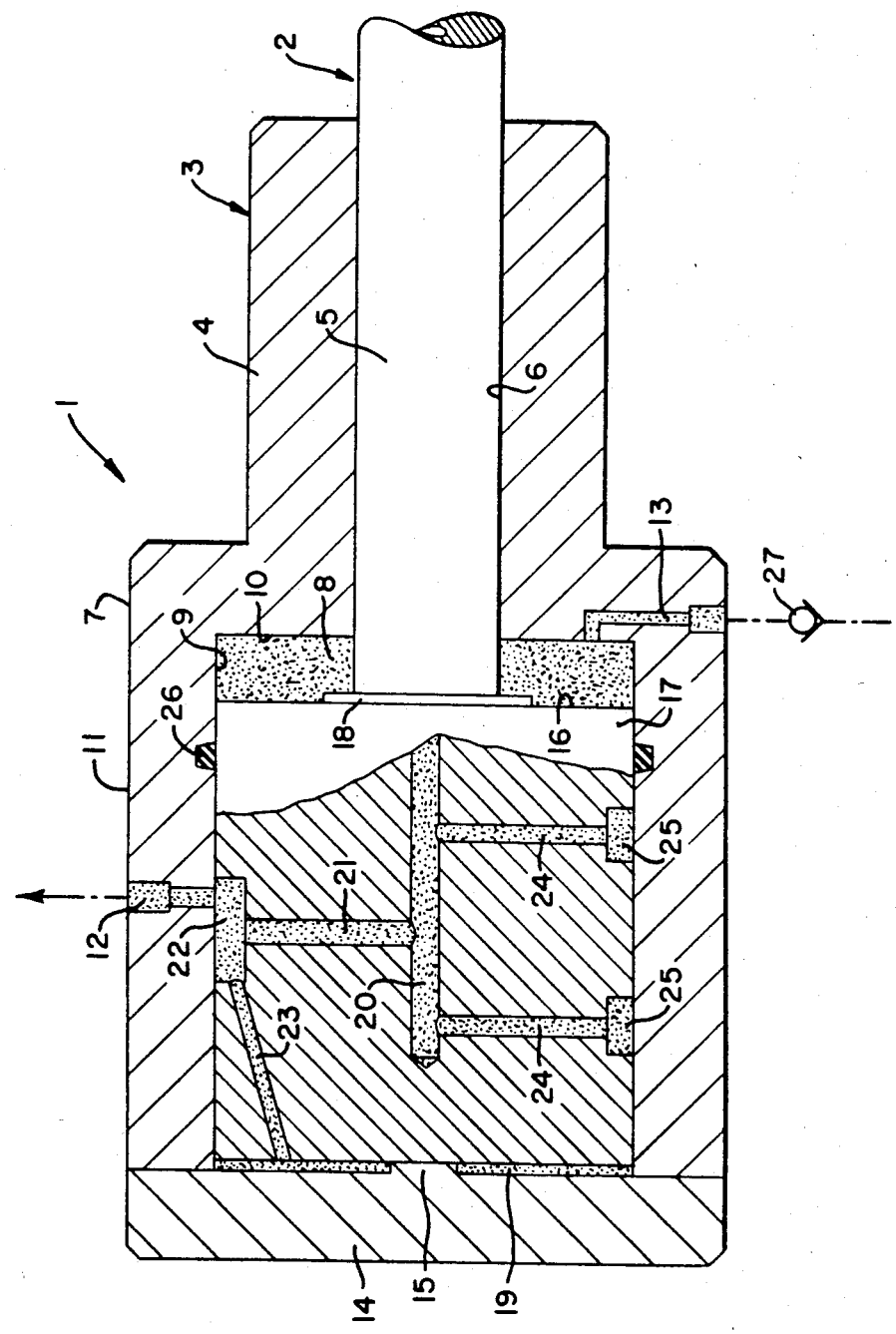

MECHANICAL SEALING MEANS FOR ROTARY FLUID COUPLING

BACKGROUND OF THE INVENTION

While not necessarily limited thereto, the present invention is particularly adapted for use as a mechanical seal for a fluid coupling which enables liquid to be transferred between two relatively rotatable parts. The inner part of the coupling, which has a central bore extending therethrough for conveying fluid under high pressure, is disposed within a cylindrical outer part closed at one end by a cover. The central bore in the inner part which conveys fluid under high pressure merges into at least one radial bore which opens into a recess disposed on the periphery of the inner part. This recess, in turn, is adapted to be connected to a port in the outer cylindrical part.

In copending application Ser. No. 217,618, filed Dec. 18, 1980 and assigned to the Assignee of the present application, a mechanical seal for a fluid coupling is shown comprising an inner part rotatable within an outer part. The inner part has one or more radial bores which extend from a central passageway conveying fluid under high pressure to its periphery where the radial bores are adapted to communicate with ports in the outer part. A large diameter portion of the inner part is exposed at both ends to a sealing fluid which is compressed by a cylindrical piston acted on by high-pressure fluid within the central bore of the inner part. Consequently, the pressure of the sealing fluid is always equal to that of the high pressure fluid.

Since the sealing fluid in the apparatus of copending application Ser. No. 217,618 is at the same pressure as the high-pressure fluid, the high-pressure fluid cannot be prevented from flowing into the chamber filled with the sealing fluid. As a consequence, it is possible, particularly after prolonged operation, for the high-pressure fluid to reach the aforementioned chamber containing the sealing fluid where it will form an emulsion which no longer has the properties of a sealing fluid and cannot reliably seal the device.

SUMMARY OF THE INVENTION

In accordance with the present invention, the foregoing drawbacks of a seal such as that shown in copending application Ser. No. 217,618 are obviated by insuring that the pressure of the sealing fluid is always higher than that of the fluid under high pressure which is conveyed from one part of a rotary coupling to another.

Specifically, there is provided a fluid coupling for interconnecting a fluid-conveying duct in a shaft element to a duct in a hub element with at least one of the elements being rotatable relative to the other. The fluid coupling comprises a bore in the aforesaid hub element which receives a shaft element, the hub and shaft elements having cooperating large diameter portions which communicate with small-diameter portions. An axial passageway extends through the shaft element and is adapted to be connected at one end to a source of fluid under high pressure. A radial passageway connects high-pressure fluid in the axial passageway to a groove in the periphery of the large diameter shaft portion; while an output port in the hub element is adapted to communicate with the groove. The end of the large diameter shaft portion opposite its reduced-diameter portion is subjected to the high-pressure fluid in the axial passageway; while the other end of the large diameter shaft portion is subjected to a sealing fluid. By insuring that the pressure exerted on the shaft portion by the sealing fluid is greater than that exerted by the high-pressure fluid, it is impossible for the high-pressure fluid to flow into the sealing fluid and form the aforesaid undesirable emulsion.

The above and other objects and features of the invention will become apparent from the followng detailed description taken in connection with the accompanying single FIGURE drawing which forms a part of this specification.

With reference now to the drawing, the fluid coupling of the invention is indicated generally by the reference numeral 1. It comprises an inner shaft element 2 disposed within a surrounding hub element 3. The shaft element 2 comprises a large diameter portion 17 connected to a smaller-diameter portion 5. The large diameter shaft portion 17 is disposed within a large diameter bore 9 in the hub 3; while the shaft 5 is disposed within a communicating smaller-diameter bore 6. The large diameter bore 9 is closed by an end cap 14 having a central, cylindrical projection 15 extending into the bore. Screws or the bolts, not shown, connect the cover 14 to the end of the hub 3 opposite the shaft portion 5.

Extending through the small diameter and large diameter portions 5 and 17 of the shaft element 2 is a central passageway or bore 20 communicating with radial passageways 21 and 24. Passageway 21 is connected to a groove 22 in the outer periphery of the large diameter portion 17 and is adapted to communicate with an output port 12 in the large diameter hub portion 7, depending upon the angular position of the shaft element 2 with respect to the hub element 3. That is, by rotating the shaft element 2 within the hub element, or vice-versa, the groove 22 can be moved into or out of registry with the output port 12. On the side of bore 20 opposite the radial bore 21 are the two bores 24 which have grooves 25 at their outer peripheral ends. These are adapted to compensate for the radial pressure load on the shaft element 2 caused by the pressure within the diametrically-opposite groove 22.

The groove 22 and bores 20 and 21 are connected through bore 23 to an annular space 19 formed between the left end of large diameter shaft portion 17 and the end cap 14. Thus, fluid under high pressure conveyed by the bore 20 is injected into the space 19 and exerts a force on the left face or end of the large diameter shaft portion 17.

The opposite face 16 of the large diameter shaft portion 17 is exposed to a sealing fluid (i.e., a high viscosity lubricant) within chamber 8 formed between the end face 16 and end face 10 of large diameter bore 9 formed in the large diameter hub portion 7. The sealing fluid is forced into the chamber 8 via passageway 13 and a check valve 27 which permits the fluid to pass into the chamber 8 but prevents its escape. Collar 18 surrounding the small diameter shaft portion 5 insures that there will always be space within the chamber 8 for the admission of sealing fluid. An annular seal 26 in a groove in the large diameter hub portion 7 surrounds the large diameter shaft portion 17 and acts to insure separation of the sealing fluid in chamber 8 from the high-pressure fluid in chamber 19. Sealing fluid can be periodically added via the check valve 27 as needed.

As was mentioned above, the pressure of the sealing fluid within chamber 8 is always greater than that of the fluid within the annular chamber 19, with the result that the high-pressure fluid in chamber 10 and/or grooves 22 and 25 will not flow past the seal 26 into the chamber 8 where it could otherwise form an emulsion with the sealing fluid and destroy the sealing properties. The sealing fluid in chamber 8 prevents the escape of fluid around the small diameter shaft portion 5.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A fluid coupling including a shaft element and a hub element having fluid conveying ducts therein, said coupling including means for interconnecting the fluid-conveying duct in said shaft element to the duct in said hub element, at least one of said elements being rotatable relative to the other, said fluid coupling comprising a bore in said hub element which receives said shaft element, said hub element and said shaft element having seal means therebetween with cooperating large diameter portions of the elements communicating with smaller-diameter portions, means forming separate chambers at opposite sides of the large diameter portion of said shaft element, an axial passageway extending through the shaft element and adapted to be connected at one end to a source of fluid under high pressure, a radial passageway connecting high-pressure fluid in said axial passageway to a groove in the periphery of said large diameter shaft portion, said seal means being situated along said large diameter portions between said groove and the chamber at said smaller-diameter portions, an output port in said hub element adapted to communicate with said groove, means for subjecting the chamber at the end of said large diameter shaft portion opposite its reduced-diameter portion to high-pressure fluid in said axial passageway, and means for subjecting the chamber at the other end of said large diameter shaft portion to a sealing fluid at a pressure at least equal to the pressure of said high-pressure fluid to prevent flow of the latter fluid past said sealing means.

2. The fluid coupling of claim 1 wherein the specific pressure of said sealing fluid is greater than that of said high-pressure fluid to prevent mixing of said high-pressure fluid with the sealing fluid at said other end of said large diameter shaft portion.

3. The fluid coupling of claim 2 wherein said seal means includes a sealing ring surrounding said large diameter shaft portion.

4. The fluid coupling of claim 2 including abutment members for preventing contact of the entire end surfaces of said large diameter shaft portion with the end surfaces of said bore in the hub element.

5. The fluid coupling of claim 2 including check valve means for injecting sealing fluid into one end of the bore formed in said hub element.

* * * * *